2,969,328
Patented Jan. 24, 1961

2,969,328
COMPOSITION FOR REMOVING COATINGS

Evelyn Ellenson and Richard Galba, both of 57 W. 57th St., New York, N.Y.

No Drawing. Filed June 20, 1957, Ser. No. 667,029

8 Claims. (Cl. 252—153)

The present invention relates to a method and composition for removing coatings, and more particularly to a simple and rapid method for removing paint, varnish, lacquer, baked resin bonds, enamel, and the like from a wide variety of materials including plaster, cement, wood, metal, tile, plastic and glass surfaces, and to a composition useful for the aforesaid method. The method and composition of the subject invention is also of utility for the cleaning of greases, oils, dirt, tar, and asphalt from a wide variety of materials including uncoated metals, woods, tile, glass and plastic surfaces, and from whitewall tires and ovens, and the like.

There has been a long felt need for relatively inexpensive methods and compositions for removing coatings, such as protective coatings like paint, varnish, lacquer, baked resin materials, enamels, greases, and oils and other coatings such as dirt, tar and asphalt from a wide variety of surfaces. Prior techniques have ranged from the use of methods involving mechanical chipping to the use of a variety of solvents and strippers.

Mechanical chipping is not satisfactory for most purposes because it is expensive, prolonged, and involves the use of procedures which cannot be readily employed by the unskilled layman, including in particular the average housewife.

A wide variety of solvent compositions have been suggested both as removers and as strippers, but in the main prior compositions and methods involving their use have not been satisfactory for a variety of reasons. Thus, the use of amine activators either singly or in combination with other solvents has proven undesirable both because of the toxic and corrosive effects on human and animal life of such materials, and because of their tendency to form explosive compositions with other materials. Similarly, mixtures of acetone and other highly efficacious solvents have been suggested, especially in admixture with highly chlorinated solvents of relatively low volatility. Such mixtures act primarily as strippers, removing the pigment portions of the coating and secondarily removing the coating in the form of a plastic gum. Such mixtures and other strippers are unsatisfactory both because of their relatively high toxicity and because their stripping action effects restaining of the coated surfaces. In addition, many prior mixtures employing acetone and other solvents are highly inflammable rendering their use most hazardous under many conditions.

This invention has as an object the provision of a method for removing a wide variety of coatings in which the coating is removed in a substantially non-stripped condition in the form of flakes and the like.

This invention has as another object the provision of a method for removing coatings which may be satisfactorily practiced by an unskilled lay person including the average housewife with a great degree of success.

This invention has as yet another object the provision of a method for removing coatings rapidly and efficaciously at a relatively low cost.

This invention has as a different object the provision of a method for removing coatings in which the hazards of explosion and combustion are entirely avoided.

This invention has as a still different object the provision of a method for removing coatings in which aerosolization techniques may be utilized to effect satisfactory removal.

This invention has as a further object the provision of a composition for satisfactorily removing a wide variety of coatings from a wide variety of substances.

This invention has as another object the provision of a composition which will rapidly, and efficaciously remove a wide variety of coatings from a wide variety of surfaces.

This invention has as yet a further object the provision of a composition which may be readily aerosolized and which is highly effective for the removal of coatings while in its aerosolized form.

These and other objects are accomplished in accordance with the subject invention in which a wide variety of coatings, such as paint, varnish, lacquer, baked resin bonds, enamel, oils, grease, dirt, tar and asphalt are removed from a wide variety of materials in the form of flakes or chips through the engagement of such coatings by aerosol particles of the composition of the subject invention. By aerosol particles as used herein is meant particles of a size of less than sixty microns in their maximum dimension, which particles may be produced by means of conventional aerosolization units, such as conventional aerosol nozzles and the like. The compositions of the present invention comprise a coating removing composition which includes methylene chlorobromide ($CH_2ClBr$) and at least one normally liquid halogenated hydrocarbon having from one to three carbon atoms and at least one halogen atom selected from the group consisting of chlorine and bromine, namely methylene bichloride, trichloroethylene, propylene dichloride, dichloroisopropane, 1,1,1 trichloroethane, and the like. Such halogenated hydrocarbons comprise the normally liquid derivatives of hydrocarbons (saturated and unsaturated) having from one to three carbon atoms. Preferably, the methylene chlorobromide should be present in a ratio of five to ninety-five parts by volume to ninety-five to five parts by volume of the normally liquid halogenated hydrocarbon. The composition should preferably contain a sufficient amount of morpholine to have a pH within the range of 6 to 8, and preferably a pH of 7. In addition to the aforesaid components, the coating removing compositions of the present invention also comprises a normally liquid solvent for natural and synthetic resins and lacquers derived from an alcohol or alcohol-ether and ethylene oxide, and acetate derivatives of such materials. Such solvent should be present in the coating removing composition to the extent of no more than about ten volume percent. Such preferred solvents include ethylene glycol monobutyl ether.

When the composition of the present invention is utilized in the process of the present invention, the coating removing composition should be admixed with a sufficient amount of an aerosol propellant which does not adversely react with any of the components of the coating removing composition to effect aerosolization when the combined mixture is discharged from an aerosolizing nozzle. Furthermore, it is highly advantageous for the combined mixture to contain a minor volume percentage such as below about three volume percentage of the total combined mixture of an amount of polyethylene equal to the amount of polyethylene contained in the twenty percent emulsion designated "A-C polyethylene 629" sold by Semet Solvay Petrochemical Division of the Allied Chemical & Dye Corporation, 40 Rector Street, New York 6, New York.

We have found that the combination of methylene chlorobromide and the halogenated hydrocarbons defined above produce in such combination a synergistic action upon a wide variety of coatings effecting the satisfactory removal of the coating in the form of flakes, without gumming.

Moreover, we have found that the aforesaid compositions which contain propylene dichloride may be used with absolute safety upon substantially all metals, since the propylene dichloride exerts an inhibiting effect upon the remaining components of the composition, which substantially completely avoids in almost all cases any adverse corrosive effect which such components might otherwise have upon the metals to which such composition is being applied.

We have found that in many instances optimum aerosolization may be achieved when the coating removing composition is admixed with aerosol propellants of the Freon type, namely the various fluorinated and chlorinated low boiling hydrocarbon derivatives marketed by E. I. du Pont de Nemours & Co., Inc. of Wilmington, Delaware, under the trademark "Freon." In particular, we have found admixtures of sixty volume percent of the coating removing composition and forty volume percent of Freon to be highly advantageous. Furthermore, we have found the presence of an amount of polyethylene equivalent to the amount of polyethylene present in the twenty weight percent emulsion known as "A-C Polyethylene 629" heretofore typified to be advantageous when such "A-C Polyethylene 629" is present in the amount of about two volume percent based on the combined mixture of coating removing composition and Freon.

As illustrative of the coating removing composition of the present invention may be mentioned the following examples in which mixtures are set forth in parts by volume:

*Example I*

|  | Parts |
|---|---|
| Chloro bromo methane | 85 |
| Propylene dichloride | 4 |
| Ethylene glycol mono ethyl ether | 8 |
| Trichloroethylene | 3 |

Sufficient morpholine to produce a pH of 7 for the composition.

*Example II*

|  | Parts |
|---|---|
| Chloro bromo methane | 55 |
| Methylene chloride | 25 |
| Propylene dichloride | 10 |
| Trichloroethylene | 5 |
| Ethylene glycol mono ethyl ether | 5 |

Sufficient morpholine to produce a pH of 7 for the mixture.

*Example III*

|  | Parts |
|---|---|
| Methylene chloride | 60 |
| Chloro bromo methane | 20 |
| Propylene dichloride | 6 |
| Trichloroethylene | 5 |
| Ethylene glycol mono ethyl ether | 9 |

Sufficient morpholine to produce a pH of 7 for the mixture.

*Example IV*

|  | Parts |
|---|---|
| Chloro bromo methane | 90 |
| Propylene dichloride | 4 |
| Ethylene glycol mono ethyl ether | 6 |

Sufficient morpholine to produce a pH of 7 for the mixture.

*Example V*

|  | Parts |
|---|---|
| Methylene chloride | 65 |
| Chloro bromo methane | 10 |
| Propylene dichloride | 10 |
| Trichloroethylene | 5 |
| Ethylene glycol mono ethyl ether | 5 |
| 1,1,1, trichloroethane | 5 |

Sufficient morpholine to produce a pH of 7 for the mixture.

In order to produce compositions which may be aerosolized and utilized in the method of the subject invention, each of the aforesaid compositions may be admixed with any one of the volatile Freons, preferably in a volume percentage of sixty volume percent of the coating removing composition and forty volume percent of the Freon. We have found that any of the conventional Freons are suitable, examples being trichlorofluoromethane, dichlorodifluoromethane, chlorotrifluoromethane, chlorodifluoromethane, or sym-dichlorotetrafluoroethane, etc. In the preferred compositions of our invention a minor volume percentage of polyethylene such as two weight percent of "A-C Polyethylene 629" is added to the combined mixture of coating removing composition and aerosol propellant. We have found that this minor amount of polyethylene serves to prevent the uncontrolled spread of the coating removing components of the composition when the same are aerosolized and sprayed in the form of aerosol particles upon a coated surface.

The process of the present invention is effected by spraying the aerosolized coating removing composition of the present invention upon a coated surface at a temperature of between 40° F. and 90° F., effecting the flaking of the coating from the coated surface within a short period of time, usually within the order of a time period of sixty seconds or so, followed by the removal of the flaked coating particles by brushing action. Brushing action, which may be effected in accordance with the process of our invention through the use of either brush means or cloth means, and we intend to include within brush means the use of both synthetic and natural bristle type brushes including brushes formed from metallic bristles, and we further intend to include within the concept of cloth means cloths having abradant surfaces, should not be commenced until the liquid components of the sprayed mixture have substantially dried. It is, however, frequently desirable to utilize brush means and/or cloth means in the process of the present invention which have been previously dipped or coated in or with the coating removing composition of the present invention.

While the preferred embodiment of the present invention comprises the aerosolizing of the coating removing composition followed by the brushing action, in the broader aspects of the present invention it is comprehended that the coating removing composition be applied to the coated surface by any desired means including spraying in the form of a stream or as large droplets, or by application on a cloth or brush, with such application being followed by removal through brushing action after the coating removing composition has had an opportunity to effect the flaking of the coating.

The method of the present invention also comprehends the multiple application of the coating removing composition with separate brushing action steps being utilized intermediate each application.

We have found the coating removing compositions of the present invention to be effective with a wide variety of materials including resins of the cellulose acetate, ethyl cellulose, styrene, vinyl ester, acrylic, alkyd, and coumarone-indene classes, coatings such as neoprene base paints, water base paints, oil base paints, enamels, red primer, epon resin base paints, indoor paints, outdoor paints, sealers, primers, lacquers, varnishes, and baked enamels.

As illustrative of the efficacy of the present invention, complete removal of a coating comprising two coats of high grade enamel paint over one coat of primer which had been present upon a surface for more than a year was effected in three minutes through the process of the present invention.

Extensive testing of the storage capabilities of the composition of the present invention in conventional small metallic aerosol containers and other receptacles revealed the complete absence of any corrosion problems, and the complete absence of any container-explosion problems.

The present invention may be embodied in other specific forms without departing from the spirit or essential attributes thereof and, accordingly, reference should be made to the appended claims, rather than to the foregoing specification as indicating the scope of the invention.

We claim:

1. A liquid composition for removing a coating from a coated surface consisting of methylene chlorobromide and at least one liquid halogenated hydrocarbon having from one to three carbon atoms and at least one halogen atom selected from the group consisting of chlorine and bromine, with the methylene chlorobromide having a ratio of from 5 to 95 parts by volume to 95 to 5 parts by volume of the liquid halogenated hydrocarbon, and sufficient morpholine to give the mixture a pH of 6 to 8.

2. A composition in accordance with claim 1 in which up to ten volume percent of a compound selected from the group consisting of ethylene glycol mono ethyl ether, ethylene glycol mono ethyl ether acetate, ethylene glycol mono methyl ether, and ethylene glycol monobutyl ether is present.

3. A composition in accordance with claim 1 in which the liquid is mixed with a volatile aerosol propellant.

4. A composition in accordance with claim 1 in which the liquid consists of eighty-five parts by volume of methylene chlorobromide, four parts by volume of propylene dichloride, three parts by volume of trichloroethylene, and eight parts by volume of ethylene glycol mono ethyl ether.

5. A composition in accordance with claim 1 in which the liquid consists of fifty-five parts by volume of methylene chlorobromide, twenty-five parts by volume of methylene chloride, ten parts by volume of propylene dichloride, five parts by volume of trichloroethylene, and five parts by volume of ethylene glycol mono ethyl ether.

6. A composition in accordance to claim 1 in which the liquid consists of sixty parts by volume of methylene chloride, twenty parts by volume of methylene chlorobromide, six parts by volume of propylene dichloride, five parts by volume of trichloroethylene, and nine parts by volume of ethylene glycol mono ethyl ether.

7. A composition in accordance with claim 1 in which the liquid consists of ninety parts by volume of methylene chlorobromide, four parts by volume of propylene dichloride, and six parts by volume of ethylene glycol mono ethyl ether.

8. A composition in accordance with claim 1 in which the liquid consists of sixty-five parts by volume of methylene chloride, ten parts by volume of methylene chlorobromide, ten parts by volume of propylene dichloride, five parts by volume of trichloroethylene, five parts by volume of ethylene glycol mono ethyl ether.

References Cited in the file of this patent

UNITED STATES PATENTS

| | | |
|---|---|---|
| 1,833,429 | Lovell et al. | Nov. 24, 1931 |
| 1,938,714 | Mills et al. | Dec. 12, 1933 |
| 1,948,045 | Parkhurst | Feb. 20, 1934 |
| 2,655,480 | Spitzer et al. | Oct. 13, 1953 |
| 2,662,837 | Duncan | Dec. 15, 1953 |
| 2,721,883 | Stevens | Oct. 25, 1955 |
| 2,728,495 | Eaton | Dec. 27, 1955 |
| 2,802,790 | Averdikian | Aug. 13, 1957 |
| 2,852,471 | Atkins et al. | Sept. 16, 1958 |
| 2,856,297 | Green | Oct. 14, 1958 |

OTHER REFERENCES

Chem. Absts., vol. 49, p. 9195g (1956).

Solvents, by Durrans, pp. 64, 65, 68–71, 150–155 and 168–178, pub. by Van Nostrand Co., Inc., New York (1950).

Beilstein, 4th ed., vol. (Band) 1, p. 67, pub. by Julius Springer, Berlin (1918).

Methocel, pp. 17–23, pub. by Dow Chem. Co., Midland, Mich., (1949).